United States Patent
Caillot et al.

(10) Patent No.: US 9,834,179 B2
(45) Date of Patent: Dec. 5, 2017

(54) HEATING HYDRAULIC INTERFACE FOR A MOTOR-VEHICLE WINDSCREEN WASHER LIQUID SUPPLY AND/OR DISTRIBUTION SYSTEM

(71) Applicant: Valeo Systèmes d'Essuyage, Le Mesnil Saint Denis (FR)

(72) Inventors: Gérald Caillot, Cernay la Ville (FR); Vincent Izabel, Chilly Mazarin (FR); Jean-Michel Jarasson, Le Mesnil Saint Denis (FR)

(73) Assignee: Valeo Systemes d'Essuyage, Le Mesnil Saint Denis (FR)

( * ) Notice: Subject to any disclaimer, the term of this patent is extended or adjusted under 35 U.S.C. 154(b) by 272 days.

(21) Appl. No.: 14/548,663

(22) Filed: Nov. 20, 2014

(65) Prior Publication Data

US 2015/0139631 A1    May 21, 2015

(30) Foreign Application Priority Data

Nov. 21, 2013  (FR) ..................... 13 61479

(51) Int. Cl.
- *F24H 1/10* (2006.01)
- *B60S 1/48* (2006.01)
- *B60S 1/52* (2006.01)

(52) U.S. Cl.
CPC ............... *B60S 1/488* (2013.01); *B60S 1/524* (2013.01)

(58) Field of Classification Search
None
See application file for complete search history.

(56) References Cited

U.S. PATENT DOCUMENTS

| | | | | |
|---|---|---|---|---|
| 4,088,269 A | * | 5/1978 | Schlick | B05B 1/24 137/341 |
| 4,212,425 A | * | 7/1980 | Schlick | B05B 1/24 137/341 |
| 4,360,158 A | * | 11/1982 | Bauer | B60S 1/48 239/284.1 |
| 4,497,083 A | * | 2/1985 | Nielsen, Jr. | B60S 1/3805 15/250.06 |
| 4,815,769 A | * | 3/1989 | Hopperdietzel | B05B 1/24 138/33 |
| 5,426,814 A | * | 6/1995 | Minnick | B60S 1/3805 15/250.04 |
| 5,430,909 A | * | 7/1995 | Edele | B60S 1/3415 15/250.04 |
| 5,504,965 A | * | 4/1996 | Guell | B60S 1/3805 15/250.06 |

(Continued)

FOREIGN PATENT DOCUMENTS

WO    2011/032679 A1    3/2011

*Primary Examiner* — Thor Campbell
(74) *Attorney, Agent, or Firm* — Osha Liang LLP

(57) ABSTRACT

A hydraulic interface configured to be installed between a windscreen washer liquid feed tube and a connector of a device for wiping a window of a motor vehicle is disclosed. The interface includes a body that defines at least one passage channel for the windscreen washer liquid, and at least one electric heating conductor that is disposed so as to heat said windscreen washer liquid, said body being configured to secure said conductor to said body by fitting together different parts of said body and/or by fitting to shapes made in one piece with said body.

12 Claims, 3 Drawing Sheets

(56) References Cited

U.S. PATENT DOCUMENTS

Figure 1:
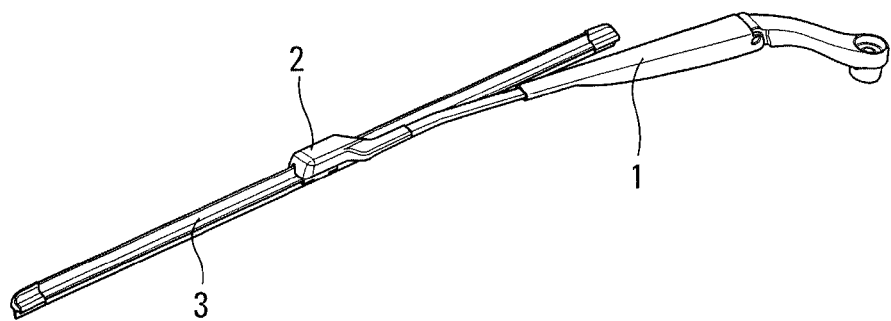

| Patent No. | | Date | Inventor | Classification |
|---|---|---|---|---|
| 5,572,765 | A * | 11/1996 | Guell | B60S 1/3805 15/250.06 |
| 5,632,058 | A * | 5/1997 | Stanak | B60S 1/3805 15/250.04 |
| 6,100,499 | A * | 8/2000 | Davila, Sr. | B60Q 1/2684 15/250.04 |
| 6,140,608 | A * | 10/2000 | Stingone, Jr. | B60S 1/3805 15/250.04 |
| 6,155,299 | A * | 12/2000 | Martin | B60S 1/52 137/846 |
| 6,220,524 | B1 * | 4/2001 | Tores | B05B 1/24 239/130 |
| 6,290,265 | B1 * | 9/2001 | Warburton-Pitt | F16L 47/02 285/131.1 |
| 6,393,652 | B1 * | 5/2002 | Vogt | B60S 1/522 15/250.01 |
| 6,501,907 | B1 * | 12/2002 | Rehs | B60S 1/52 239/133 |
| 6,779,222 | B2 * | 8/2004 | Tobias | B60S 1/3805 15/250.07 |
| 7,269,876 | B2 * | 9/2007 | Vogt | B60S 1/522 15/250.01 |
| 7,311,268 | B2 * | 12/2007 | Sporer | B60S 1/52 239/128 |
| 7,669,786 | B2 * | 3/2010 | Semmelroth | B60S 1/52 239/284.1 |
| 7,875,835 | B2 * | 1/2011 | Tanaka | F16L 37/12 138/33 |
| 8,381,348 | B2 * | 2/2013 | Egner-Walter | B60S 1/381 15/250.04 |
| 8,755,681 | B2 * | 6/2014 | Leonard | F01N 3/2066 392/441 |
| 9,303,805 | B2 * | 4/2016 | Schwarzkopf | F16L 25/01 |
| 9,366,454 | B2 * | 6/2016 | Dude | F16L 25/01 |
| 9,429,259 | B2 * | 8/2016 | Borgmeier | F16L 25/01 |
| 2004/0226127 | A1 * | 11/2004 | Kaplan | B60S 1/488 15/250.04 |
| 2004/0256491 | A1 * | 12/2004 | Sporer | B60S 1/52 239/525 |
| 2005/0183227 | A1 * | 8/2005 | Hienzsch | B60S 1/3803 15/250.07 |
| 2008/0256738 | A1 * | 10/2008 | Malone | B60S 1/3805 15/250.06 |
| 2010/0133356 | A1 * | 6/2010 | Shank | B05B 9/002 239/284.1 |
| 2010/0290764 | A1 * | 11/2010 | Borgmeier | F16L 25/01 392/468 |
| 2012/0174333 | A1 * | 7/2012 | Heidacker | B60S 1/487 15/250.01 |
| 2013/0291328 | A1 * | 11/2013 | Schmid | B60S 1/3805 15/250.04 |
| 2014/0352095 | A1 * | 12/2014 | Caillot | B60S 1/488 15/250.01 |
| 2015/0135462 | A1 * | 5/2015 | Caillot | B60S 1/3879 15/250.04 |
| 2016/0121853 | A1 * | 5/2016 | Uchiyama | B60S 1/522 15/250.04 |

* cited by examiner

HEATING HYDRAULIC INTERFACE FOR A MOTOR-VEHICLE WINDSCREEN WASHER LIQUID SUPPLY AND/OR DISTRIBUTION SYSTEM

The technical sector of the present invention is that of windscreen washer liquid supply and/or distribution systems for motor vehicles, and more particularly that of hydraulic interfaces installed between a windscreen washer liquid feed tube and a connector of a device for wiping windows of the vehicle.

Motor vehicles are commonly equipped with a wiper installation and a washing system for wiping and washing the windscreen and avoiding disruption to the driver's view of his surroundings. Wiper systems comprise arms which carry out an angular to-and-fro movement and at the end of which there are installed elongate wipers which themselves carry squeegee blades made of a resilient material. The blades rub against the windscreen and evacuate the water by removing it from the driver's field of view.

Washing systems comprise a device for feeding windscreen washer liquid which is led from a tank located in the vehicle and which is sprayed in the direction of the windscreen by nozzles located generally on the bonnet, on the grille of the windscreen frame or, in a more recent version, on the windscreen wipers, in particular for wipers of the "flat blade" type, that is to say for wipers that themselves have a bend that allows them to be mounted on the arms without the use of brackets or yokes.

For some types of wiper system, the windscreen washer liquid is thus led from the tank and via a pump as far as one or more ramp(s) for spraying liquid, said ramp(s) not being visible and being distributed along the wiper. Each ramp thus extends along a longitudinal axis defining the length of the windscreen wiper. One or more windscreen washer liquid feed tube(s) border(s) the arm as far as a connector for establishing an articulated connection between the arm and the wiper. The feed tube may comprise one or more line(s) for transporting liquid. The connector thus has orifices that are able to receive, by way of a sealed connection, an element for connecting the lines to the connector.

When the temperature of the windscreen washer liquid is too low, for example below 5° C., the windscreen washer liquid is heated. To this end, a heating device located in the region of the feed tube heats the windscreen washer liquid taken from the tank at the time that the windscreen washer control is actuated, generally by way of the control lever that is positioned next to the steering wheel and controls, inter alia, the actuation of the windscreen wipers.

The connecting element installed between the line and the connector is not heated. It is thus able to form a cold zone where the windscreen washer liquid freezes. This situation is problematic since this ice, at discrete locations of the windscreen washer liquid supply and/or distribution system that are difficult to access, can render the washing function entirely unavailable even though the rest of the system is heated.

The document WO2011/032679 proposes a solution to this problem by installing an electric heating means in the connecting element. The heating means is embedded in the connecting element, thereby making it more complicated to manufacture the latter.

The invention proposes improving the situation and thus to this end the subject of the invention is a hydraulic interface belonging to a windscreen washer liquid feed system of a device for wiping a window of a motor vehicle, said interface comprising a body that defines at least one passage channel for the windscreen washer liquid, and at least one electric heating conductor that is disposed so as to heat said windscreen washer liquid, said body being configured to secure said conductor to said body by fitting together different parts of said body and/or by fitting to shapes made in one piece with said body.

In other words, the body is formed beforehand in one or more parts and then the conductor(s) are fitted on said body, on which they are retained by the shapes provided on said part(s) and/or by fitting said parts together. Such a solution makes it possible to avoid overmoulding and also makes it possible to avoid any attached means or material in the fitting of the electric heating conductor. The manufacture and fitting of the interface are thus rendered easier.

Advantageously, said electric heating conductor is inserted into at least one cavity in said body, said cavity being configured to keep said electric heating conductor(s) in position, for example. Said cavity is open at each of its longitudinal ends so as to allow said heat conductor to pass into and out of said cavity.

Advantageously, said cavity is formed with a wall in contact with said channel by way of one face of the wall and with said electric heating conductor(s) by way of an opposite face. Thus, the transfer of heat from the electric heating conductor(s) is realized as close as possible to the windscreen washer liquid.

Advantageously, said electric heating conductors are superposed in said cavity. Thus, the exchange area between the channel and the electric heating conductors is increased, with a reduced space requirement.

Said wall is preferably planar, defining a flat section on its face next to the channel. The opposite face, next to the cavity, is planar, parallel to the flat section. This arrangement helps to decrease both the dimensional space requirement of the interface, in particular in terms of width, that is to say transversely to the channel. Moreover, this configuration is favourable for good heat transfer by said wall.

Said body, including said wall, could be made of a single material. This body is advantageously moulded in one piece with said channel.

Said wall is advantageously made of a thermally conductive material, thereby in particular improving the transfer of heat through said wall. Taken in combination with the above, what is provided is an interface in which the entire body is made of thermally conductive plastics material, thereby ensuring an overall transfer of the heat from the electric heating conductor to the windscreen washer liquid passing through said channel.

Said cavity may also contain a thermally conductive material, for example a thermally conductive resin or paste, in contact with the electric heating conductor and said wall, preferably filling said cavity. These features favour an overall transfer of heat from the heating conductor to the windscreen washer liquid in the channel, without said thermally conductive material necessarily being involved in the fixing of the heating conductor(s) to the body.

Said cavity is preferably at least one groove formed in said body. Such a groove makes it possible to house the electric heating conductor in a limited space oriented along the passage channel for windscreen washer liquid, thereby benefiting the dimensional space requirement and the heat transfer performance of the interface.

Advantageously, said groove is configured to keep said electric heating conductor inside said groove, for example by being able to pinch or jam said electric heating conductor so as to allow the heating conductor to be fitted into the groove. Said pinching produces a contact joint between the heating conductor and said wall, this being favourable to the transfer of heat from the heating conductor to the windscreen washer liquid. Alternatively or in addition, said groove may be shaped so as to allow the electric heating conductor to be introduced into said groove by simple pressure, such as by clip-fastening.

Advantageously, said groove is deformed at its opening, in particular by heating, so as to form a bead that traps said electric heating conductor(s). Said opening, in particular said bead, may also be closed, in particular by welding, in particular by ultrasonic welding, thereby trapping the electric heating conductor(s) even more rigidly.

Said body advantageously has two portions, a main portion configured to be connected to said connector and an angled portion configured to be connected to said feed tube. Said groove is thus advantageously formed in said main portion, thereby making it easier to fit said heating conductor(s).

Preferably, the hydraulic interface comprises two passage channels for windscreen washer liquid, specifically a first and a second channel, and said electric heating conductor(s) form(s) at least one loop disposed along the first and second channel. Preferably, said second passage channel for windscreen washer liquid is symmetrical with the first channel with respect to a longitudinal axis of said main portion of the body.

Advantageously, the first and second channels are connected by a bridge of the body of the interface, the electric heating conductor(s) extending along said bridge.

Advantageously, the groove(s) associated with each of the first and second channels extend(s) parallel to one another, in particular along said main portion of the body, in said longitudinal direction, in particular in at least a part of the bridge, thereby making it possible to make use of the material of the bridge between the channels.

In addition or alternatively, said body may comprise a base and a cover, said cover being fixed to said base, retaining said electric heating conductor(s) between said base and said cover. In particular, said electric heating conductor(s) are sandwiched between said base and said cover. Said cover may close the abovementioned cavity/cavities.

Said interface may in particular be intended to be installed between a windscreen washer liquid feed tube and a connector of a wiper device, said interface comprising a first end intended to form a joint with the connector and a second end intended to form a joint with the feed tube. In a known manner, the connector is connected to the windscreen wiper and transmits forces towards the wiper, and it forms with the adapter the connecting interface between the arm and the wiper. The adapter is for its part an intermediate component that ensures compatibility between different shapes of the arm end and a single windscreen wiper. The adapter and the connector are articulated in rotation with respect to one another about an axis perpendicular to the wiper.

The invention also covers a windscreen washer liquid supply and/or distribution system of a wiper installation for a motor vehicle, comprising at least one windscreen washer liquid feed tube, at least one cable that forms a heat source and an interface comprising any one of the characteristics presented above.

Preferably, said cable that forms a heat source extends through the windscreen washer liquid feed tube, and is in particular co-extruded in said tube.

Advantageously, said electric heating conductor disposed at the interface forms one and the same cable as the cable that forms a heat source extending along the windscreen washer liquid feed tube, such that no electrical connection is necessary in order to connect the electric heating conductor to said cable forming heat source.

The invention also relates to a wiper device comprising the above-described supply system.

Figure 2:
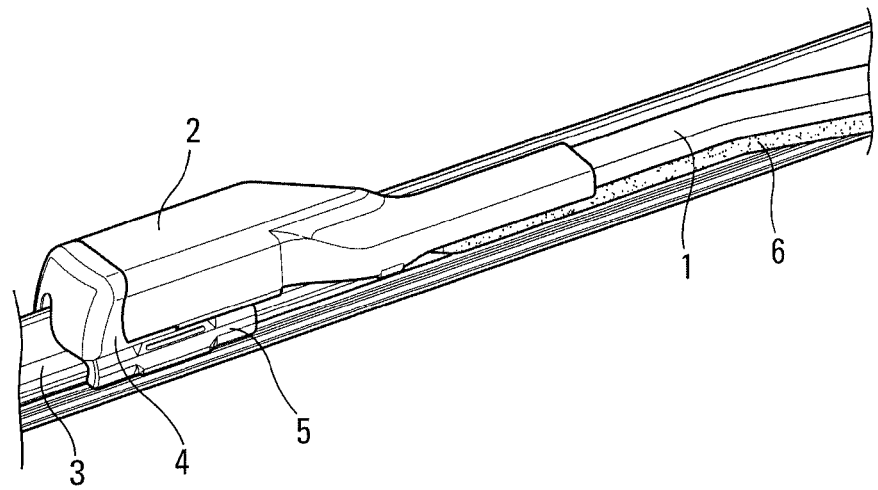
Figure 3:
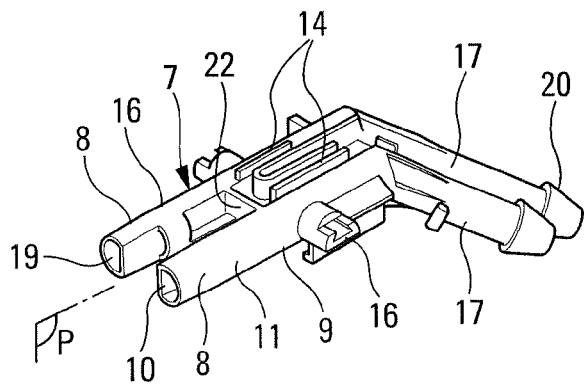
Figure 4:
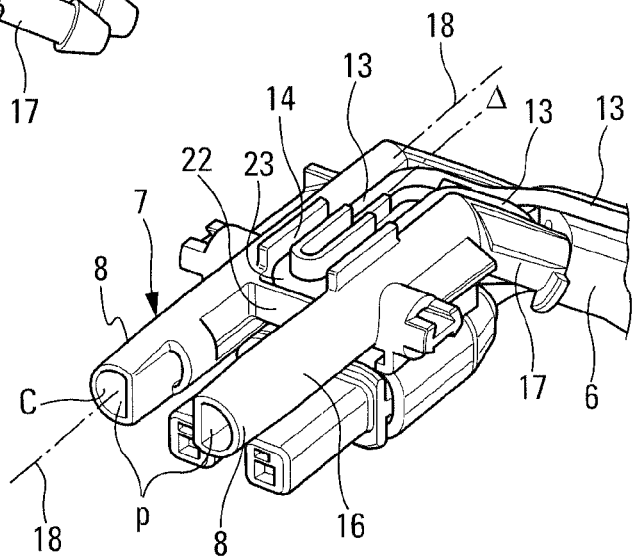
Figure 6:
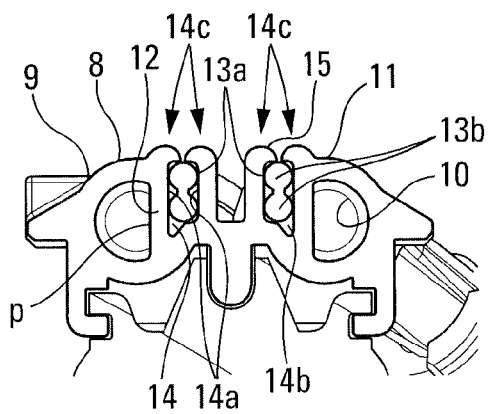
Figure 5:
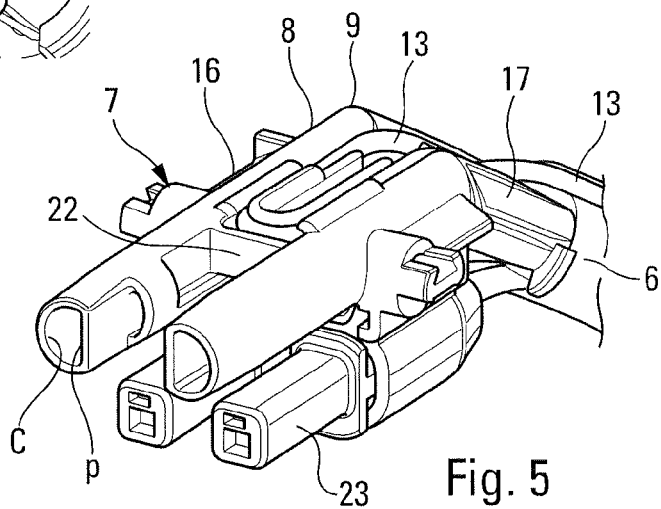
Figure 7:
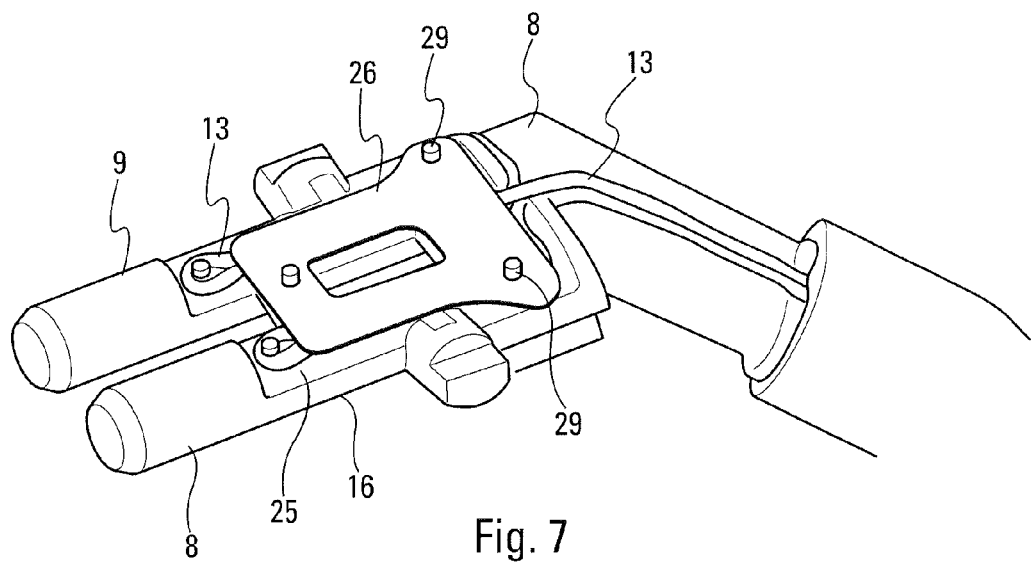
Figure 8:
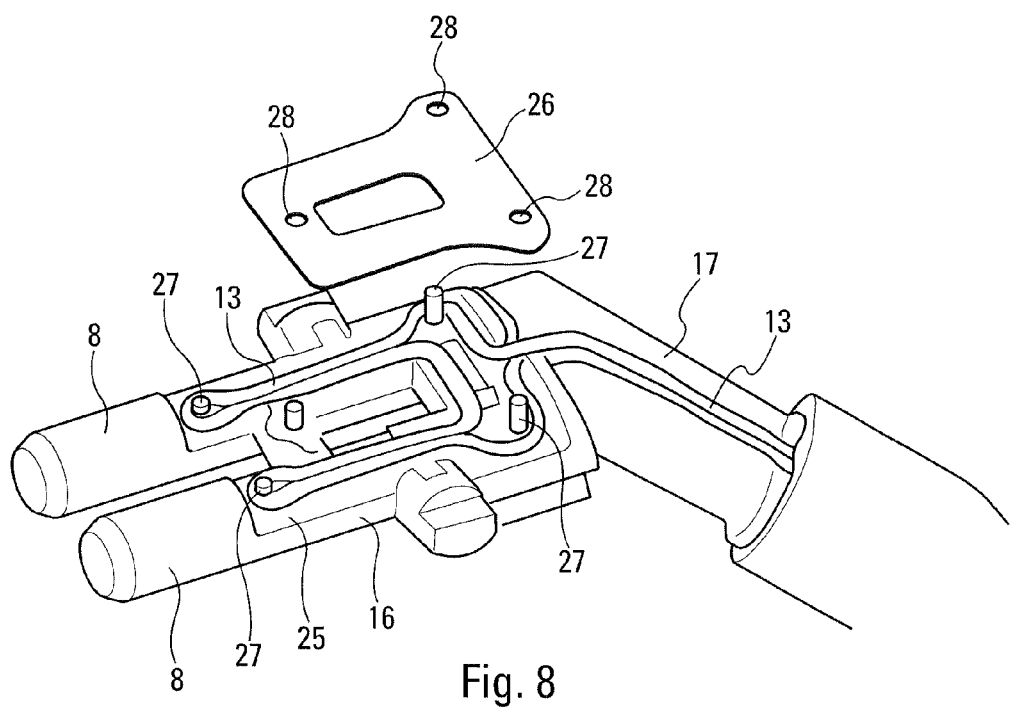

Further features, details and advantages of the invention will become more clearly apparent on reading the description given below by way of indication in conjunction with the appended drawings, in which:

FIG. 1 is an overall perspective view of a wiper device for a motor vehicle, comprising a hydraulic interface according to one embodiment of the invention, FIG. 2 is a detail view of FIG. 1, FIG. 3 is a perspective view of the hydraulic interface of the wiper device according to FIG. 1, without the electric heating conductor or the windscreen washer liquid feed tube, FIG. 4 is a perspective view of the abovementioned hydraulic interface, on which the electric heating conductor has been pre-fitted and the hydraulic feed tube has been connected, FIG. 5 is a perspective view of the hydraulic interface from FIG. 4, on which the electric heating conductor has been fitted, FIG. 6 is a cross-sectional view of the hydraulic interface according to FIG. 5, and FIGS. 7 and 8 show, in perspective, a hydraulic interface of a wiper device for a motor vehicle according to a variant embodiment of the invention, the body of said interface being illustrated in a fitted-together and exploded manner, respectively.

With reference to FIGS. 1 and 2, a wiper device for a window of a motor vehicle, also known as a windscreen wiper, can be seen, said wiper device being composed of a wiper holder or arm 1 that is terminated at its outer end by a clevis 2, which is fixed, in particular, by crimping to the arm 1. Alternatively, this clevis may also be formed at the end of the arm by deformation of the latter, and form a unitary assembly with the arm. The latter has the function, by way of an adapter (not shown) and a connector 4, of supporting a windscreen wiper 3.

The windscreen washer liquid intended to clean the windscreen is led from a tank and via a pump as far as one or more ramp(s) for spraying liquid which are not visible in these figures and are distributed along the wiper 3. Each ramp thus extends along a longitudinal axis defining the length of the windscreen wiper.

The connector 4 is secured to the structure of the windscreen wiper 3 and both transmits forces to the wiper and transports and distributes windscreen washer liquid to the windscreen wiper; while the adapter is an intermediate piece that ensures compatibility between the different shapes of clevis and a single windscreen wiper. The adapter and the connector 4 are articulated in rotation with respect to one another about an axis perpendicular to the wiper 3.

A windscreen washer liquid feed tube 6 borders the arm 1 as far as the connector 4. According to a first variant of the invention, such a feed tube comprises a single windscreen washer liquid feed channel. According to another variant of the invention, the feed tube 6 comprises a plurality of channels, in particular two that are separated from one another. Such a configuration is particularly suitable in the case where the wiper device comprises a windscreen wiper 3 with two opposite spraying ramps that extend along a longitudinal axis defining the length of the windscreen wiper.

The feed tube 6 is connected at least mechanically and hydraulically to the connector 4 by a hydraulic interface 7 according to the invention, this being visible in FIG. 3 and the subsequent figures. The function of this interface is in particular to make it easier to connect/disconnect the connector 4 to or from the feed tube, during replacement of the windscreen wiper on account of wear, for example.

The interface 7 is hydraulic in that it channels the windscreen washer liquid between the feed tube 6 and the connector 4. According to the invention, it comprises a body 9 that defines at least one passage channel 8 for the windscreen washer liquid, and at least one electric heating conductor 13 disposed close to the channel 8 in said body 9, said body 9 being configured to connect said conductor 13 to said body itself.

The hydraulic interface 7 in this case comprises two identical channels 8 that are identical and parallel to the passage for the windscreen washer liquid. Each channel 8 has a tubular shape with a generally circular section. The assembly has a median longitudinal plane of symmetry P.

Each channel 8 is delimited by an internal face 10 in contact with the windscreen washer liquid, the body 9 of the hydraulic interface 7 having an external face 11 in contact with the surrounding air.

As already indicated, the hydraulic interface 7 has one or more electric heating conductors 13 of the electric heating wire type. Their function is to convert the electric current which passes through them into heat to be dissipated in the region of the body 9, and in particular for example in the region of each channel 8.

As illustrated in FIGS. 3 to 6, these electric heating conductors 13 are inserted into at least one cavity 14 in said body 9, said cavity 14 being for example formed in the external face 11 of said body.

Advantageously, this cavity 14 is in the form of a groove that accommodates the electric heating conductor(s) 13, in particular having a U-shaped section. In other words, such a cavity 14 is a deformation in the external face 11 of the body in order to form a grooved zone.

In the embodiment shown in FIGS. 3 to 6, there are two of said conductors 13 and they are disposed in the groove 14 so as to be superposed between the opposite lateral faces 14a that define the groove 14. One of the conductors 13 bears against the bottom 14b of the groove and the other is held by an upper bead 14c that forms an abutment in the region of the opening 15 of the groove.

In this case, there are two passage channels 8 for windscreen washer liquid, and provision is thus advantageously made of two cavities 14, each being located along a part of a channel so as to optimize the heating of the body 9. As shown in FIG. 6, said grooves are defined, for example, between the two channels. Said grooves are defined by the ribs that are made in one piece with the body 9. The lateral faces 14a of each groove extend parallel to one another. The two lateral faces 14a that each belong to one of the grooves and are disposed opposite one another are spaced apart from one another by an end wall that extends substantially perpendicularly to said lateral faces 14a. Thus, these two lateral faces 14a and the end wall form a U-shape.

Said electric heating conductor(s) may form one or more loops 13a, in this case two, that pass through each of the grooves. In other words, a first strand of each of the loops passes through a first of the grooves and a second strand of the same loop passes through the other groove.

Advantageously, the loops 13a of the electric heating conductor are firstly introduced into the grooves 14, pre-fitted to the latter, being lightly clamped thereby in order to be kept in position, in particular by way of their lateral faces 14a, as is visible in FIG. 4. These loops 13a are then secured to the grooves 14 by folding down the edges of their opening 15 towards the interior in order to form said beads 14c as can be seen in FIGS. 5 and 6. This folding down of the edges is advantageously carried out in the hot state and/or by ultrasound.

As a variant, in order to improve the pullout resistance of the heating conductors, the upper parts of each wall delimiting the cavities can comprise regularly spaced-apart protuberances. Preferably, the upper parts of each wall delimiting one and the same cavity have staggered protuberances. Thus, during the step of fitting the heating conductors 13 on the body 9, consisting of folding down the edges, increased resistance of the wires is obtained since the space resulting in the region of the opening 15 is eliminated or greatly reduced.

As a variant, said cavity/cavities or groove(s) can have a cover (not shown) for closing their opening, it being possible for said cover to be involved in keeping the heating conductor in position in its housing.

It will be noted that, according to the exemplary embodiment, the internal section of the channels may be a combination of an arc of a circle C and a flat section p, the flat section p being disposed next to the electric heating conductors 13, as can be seen in FIG. 6.

Said groove(s) 14 are formed with a wall 12 in contact with the channel 8 by way of said flat section p, and in contact with said electric heating conductor(s) 13 by an opposite external face 14a. Said lateral face 14a of the grooves is planar, parallel to the flat section p, being close to the latter, at a distance for example of 0.3 to 3 mm therefrom.

The body 9 and in particular said wall 12 of the groove are advantageously made of a thermally conductive material, for example a thermally conductive plastics material, thereby ensuring a transfer of heat from the heating conductor 13 to the windscreen washer liquid in order to heat it and/or defrost it as the case may be.

In a variant embodiment which is not shown, the groove(s) or cavity/cavities 14 can contain a thermally conductive material (not shown) in contact with the electric heating conductor 13 and with said wall 12, it being possible for this material also to fill the cavity or groove 14, in particular in order to protect the conductor 13.

Each channel 8 has two portions 16 and 17, a main one 16 of which extends in a longitudinal direction of the interface, illustrated by the reference 18 in FIG. 4. Said electric heating conductors 13 extend along the channels 8 over their two portions 16 and 17. Said electric heating conductors 13 are kept in said portion 16 by said body, as explained above, whereas they are kept by their own rigidity along the other portion 17, such that they remain in position.

In other words, although said grooves 14 can be disposed along the two portions 16 and 17 of the channel, they extend in this case over a part of the main portion 16, only. Said electric heating conductors 13 extend in particular by way of their loops 13a, by way of the two superposed strands 13b of said loops, along a longitudinal axis Δ, which is parallel to the longitudinal direction 18, in said grooves 14. Said grooves 14 are thus straight and their length is adapted so as to allow, in conjunction with their substantially median positioning on the portion 16, a transfer of heat to the channel 8 which is sufficient to rapidly defrost the windscreen washer liquid in the interface if necessary.

It should be noted that at the free end 19 of the main portion 16 of the channel, a section of free length is formed to provide an interlocking joint with the connector 4. The same is the case at the free end 20 of the other portion 17 in order to allow it to be joined to the feed tube 6. This other portion 17 forms a non-zero angle with the longitudinal direction 18, and is thus angled relative to the main portion 16. It should be noted that it is perfectly possible for the portion 17 also to be rectilinear.

The two passage channels 8 for windscreen washer liquid are in this case mechanically connected to one another by a bridge 22 disposed approximately in a median zone of each of the main portions 16 of the channels. Said ribs defining the grooves 14 of each of the channels 8 are advantageously formed in a part of the thickness of the bridge 22 between the channels 8, being symmetrical to one another relative to said median longitudinal plane P of the interface.

The electric heating conductor(s) 13 may be made in one piece with the feed tube 6 that feeds the interface 7.

Thus, the electric heating conductor(s) 13 lead from the feed tube 6 along the angled portion 17 of the first channel, then extend over the main portion 16 of this first channel 8, then over the bridge 22, in a free manner over the width of the latter on that side of the bridge that faces towards the ends 19 of the portions 16, then along the second channel 8 in order to return to the angled portion 17 of this second channel and finally to return to the feed tube 6. These electric heating conductors 13 are for example co-extruded in the feed tube 6 and in particular disposed between the two passage channels for windscreen washer liquid of the feed tube.

It will be very particularly noted that the two channels 8 and the bridge 22 form a single piece, produced by a moulding operation from one polymer material.

Furthermore, the hydraulic interface 7 is in this case associated with an electrical connection device 23 for connecting to the connector 4 disposed under the interface, at the face opposite the one that is provided with grooves 14, as can be seen in FIGS. 4 and 5. Such a device 23 makes it possible in particular to supply a heating device disposed in the region of the wiper. In order to limit the space requirement in such a configuration, said grooves 14 may be offset upwards rather than being centred with respect to said channels.

According to the variant embodiment in FIGS. 7 and 8, said body 9 comprises a base 25 and a cover 26, said cover 26 being fixed to said base 25, retaining said electric heating conductor(s) 13 between said base and said cover. In particular, said electric heating conductor(s) 13 are sandwiched between said base 25 and said cover 26. As is shown in FIG. 8, where the cover 26 has been detached from the base 25, the latter comprises a flat part or planar region, this flat part receiving the electric heating conductor(s) 13 along the main portion 16 of said channels 8.

Thus, as can be seen in FIG. 8, the electric heating conductor wire 13 extends around pegs 27 extending over the main portion 16, projecting from the surface of the flat part at the corners thereof. The cover 26 is fixed to the flat part 25, in this case by passing some of the pegs 27 into the orifices 28 in the cover, then forming on the pegs a bead 29, visible in FIG. 7, that forms an abutment for retaining the cover. The bead 29 is formed preferably in the hot state, for example by ultrasonic welding. The cover can also be fixed to the base by adhesive bonding or clip-fastening.

The assembly formed by the feed tube 6 for windscreen washer liquid, the cable 13 that forms a heat source and the hydraulic interface 7 according to the invention presented above, forms at least a part of a windscreen washer liquid supply and/or distribution system of a wiper installation for a motor vehicle.

The invention thus relates to a hydraulic interface for a windscreen washer liquid supply and/or distribution system of a wiper installation for a motor vehicle, which has a simple structure and allows rapid defrosting of the windscreen washer liquid in said interface.

The invention claimed is:

1. A hydraulic interface belonging to a windscreen washer liquid feed system of a device for wiping a window of a motor vehicle, said interface comprising:
   a body that includes at least one passage channel for the windscreen washer liquid;
   at least one electric heating conductor that is disposed to heat said windscreen washer liquid; and
   a first passage channel and a second passage channel for windscreen washer liquid, said at least one electric heating conductor forming at least one loop disposed along the first and the second channels,
   wherein said body is configured to secure said at least one electric heating conductor to said body by fitting together different parts of said body and/or by fitting to shapes made in one piece with said body, and
   wherein said body comprises at least one cavity configured to be deformed at its opening to form a bead that traps said at least one electric heating conductor.

2. The interface according to claim 1, wherein said at least one electric heating conductor is inserted into the at least one cavity in said body, said cavity being configured to keep said at least one electric heating conductor in position.

3. The interface according to claim 2, wherein said cavity is formed with a wall in contact with the channel by way of one face of the wall and with said at least one electric heating conductor by way of an opposite face.

4. The interface according to claim 3, wherein said wall is planar, defining a flat section on the one face of the wall next to the channel.

5. The interface according to claim 2, wherein said at least one electric heating conductor is superposed in said cavity.

6. The interface according to claim 2, wherein said cavity is a groove.

7. The interface according to claim 6, wherein said groove is configured to keep said at least one electric heating conductor inside said groove.

8. The interface according to claim 1, wherein said body comprises a base and a cover, said cover being fixed to said base, retaining said at least one electric heating conductor between said base and said cover.

9. The interface according to claim 1, wherein the first and second channels are connected by a bridge belonging to the body of the interface, said at least one electric heating conductor extending along said bridge.

10. The interface according to claim 1, wherein said interface is installed between a windscreen washer liquid feed tube and a connector of a wiper device, said interface comprising a first end intended to form a joint with the connector and a second end intended to form a joint with the feed tube.

11. A windscreen washer liquid supply and/or distribution system of a wiper installation for a motor vehicle, comprising:
    at least one windscreen washer liquid feed tube;
    at least one cable that forms a heat source; and
    an interface according to claim 1.

12. A hydraulic interface belonging to a windscreen washer liquid feed system of a device for wiping a window of a motor vehicle, said interface comprising:
    a body that includes at least one passage channel for the windscreen washer liquid;

at least one electric heating conductor that is disposed to heat said windscreen washer liquid; and a first passage channel and a second passage channel for windscreen washer liquid, said at least one electric heating conductor forming at least one loop disposed along the first and the second channels, wherein said body is configured to secure said at least one electric heating conductor to said body by fitting together different parts of said body and/or by fitting to shapes made in one piece with said body, and wherein said body comprises a base and a cover, said cover being fixed to said base, retaining said electric heating conductor between said base and said cover.

\* \* \* \* \*